United States Patent
Alharith et al.

(10) Patent No.: US 11,739,610 B2
(45) Date of Patent: Aug. 29, 2023

(54) METHODS AND SYSTEMS FOR WATER SHUT-OFF

(71) Applicant: SAUDI ARABIAN OIL COMPANY, Dhahran (SA)

(72) Inventors: Abdullah M. Alharith, Khobar (SA); Ayman M. Al Mohsen, Doha (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/952,749

(22) Filed: Nov. 19, 2020

(65) Prior Publication Data

US 2022/0154548 A1    May 19, 2022

(51) Int. Cl.
| | |
|---|---|
| *E21B 33/138* | (2006.01) |
| *C04B 28/26* | (2006.01) |
| *C09K 8/487* | (2006.01) |
| *C09K 8/516* | (2006.01) |
| *E21B 33/12* | (2006.01) |

(52) U.S. Cl.
CPC ............ *E21B 33/138* (2013.01); *C04B 28/26* (2013.01); *C09K 8/487* (2013.01); *C09K 8/516* (2013.01); *E21B 33/1208* (2013.01)

(58) Field of Classification Search
CPC ...... E21B 47/135; E21B 33/13; E21B 33/138; E21B 43/26; E21B 33/14; E21B 36/04; E21B 43/2401; E21B 43/04; E21B 47/113
See application file for complete search history.

(56) References Cited

U.S. PATENT DOCUMENTS

| | | | |
|---|---|---|---|
| 3,515,216 A | 6/1970 | Gies | |
| 3,566,967 A | 3/1971 | Shelton et al. | |
| 4,031,958 A | 6/1977 | Sandiford et al. | |
| 4,662,448 A | 5/1987 | Ashford et al. | |
| 10,584,274 B2 | 3/2020 | Bataweel et al. | |
| 10,683,726 B1 | 6/2020 | Al-Mulhem et al. | |
| 2015/0107833 A1* | 4/2015 | Boone ................. | E21B 43/2408 166/272.3 |
| 2018/0362827 A1* | 12/2018 | Bataweel ............... | C09K 8/426 |
| 2019/0309212 A1 | 10/2019 | Kalgaonkar et al. | |
| 2020/0048527 A1 | 2/2020 | Bataweel et al. | |
| 2020/0048530 A1* | 2/2020 | Nguyen ................. | E21B 43/267 |

FOREIGN PATENT DOCUMENTS

WO    2015040241 A1    3/2015

OTHER PUBLICATIONS

Internaitonal Search Report issued in corresponding International Application No. PCT/US2021/060007, dated Mar. 10, 2022 (3 pages).
Written Opinion issued in corresponding International Application No. PCT/US2021/060007, dated Mar. 10, 2022 (7 pages).

* cited by examiner

*Primary Examiner* — Zakiya W Bates
(74) *Attorney, Agent, or Firm* — Osha Bergman Watanabe & Burton LLP

(57) ABSTRACT

A system and method for a treatment of a subterranean formation. The treatment may include pumping a water shut-off material into a wellbore and to a target zone in the subterranean formation. The treatment may also include pumping a silicate to the target zone behind the water shut-off material, thereby forming a layer of silicate between the water shut-off material and the wellbore. An energy source may be directed to the layer of silicate until the layer of silicate solidifies to yield a solid barrier between the water shut-off material and the wellbore.

17 Claims, 3 Drawing Sheets

METHODS AND SYSTEMS FOR WATER SHUT-OFF

BACKGROUND

Controlling water production from oil producing wells is an increasingly important goal in the oil industry. Subterranean passages of water may be present in the operation of wells used in the recovery of hydrocarbons. These water passages may severely disrupt or terminate the desired operation of a well by mixing water with the hydrocarbons (oil) and producing a product with a high water cut. The presence of water in hydrocarbon production may be a result of weak reservoir formations due to fractures connecting the water zone with the oil-producing zone, water coning due to a high pressure differential between water and oil zones, and water flooding operations. In water flooding operations, water is injected into a well to mobilize the oil in the matrix toward the well and maintain, or increase, pressure in the reservoir. This injected water may end up in the production stream due to open features, high permeability formations, and other influences that divert water towards a production stream. Other factors that may cause water production include micro-cracks in cement sheets, closeness of perforations to the water zone, and high oil/water viscosity ratio.

Oil reservoirs with high water cut produce oil with high water content, adversely impacting most stages of the oil production. Excessive water production may decrease well production performance, increase operating costs, enhance the presence of scales, corrosion, and degradation in the field facilities, incur costs of liquid handling facilities, tubing pipeline erosion, broken sand control, and high power consumption. While high water cut may affect most wells, mature wells are particularly vulnerable due, in part, to depleting oil supply and limitations on the mature equipment.

Although it may be difficult (and not necessary) to completely shut-off water production in a well to keep the well economically viable, it is desirable to be able to control the water production so that the rate of oil production is not impacted by the water presence in the well.

Conventional water shut-off treatments may implement mechanical treatment techniques to prevent high cut water production. Mechanical water shut-off treatments may include plugs, packers, and tubing patches. Plugs and packers may expand small diameter elements downhole into larger diameter, thereby creating a seal and isolating the well from unwanted features or zones. Mechanical methods may also include drilling horizontal, multi-lateral wells, and placing a linear to block.

Water shut-off treatments may also be performed by chemical techniques. Conventionally, a water shut-off material is used to prevent high water cut. The water shut-off material blocks the flow from the water passage to the well by creating a plug.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a process for a treatment of a subterranean formation. The process may include pumping a water shut-off material into a wellbore and to a target zone in the subterranean formation. The process may also include pumping a silicate to the target zone behind the water shut-off material, thereby forming a layer of silicate between the water shut-off material and the wellbore. The process may also include directing an energy source to the layer of silicate until the layer of silicate solidifies to yield a solid barrier between the water shut-off material and the wellbore.

In another aspect, embodiments disclosed herein relate to a system for a treatment of a subterranean formation. The system may include a wellbore extending through the subterranean formation. The system may also include a water shut-off material configured to block a fluid from entering a wellbore. The system may also include a sealant material between the water shut-off material and the wellbore. The system may also include an energy source configured to direct energy to the sealant material and configured to increase the temperature of the sealant to form a solid barrier between the water shut-off material and the wellbore.

Other aspects and advantages of the claimed subject matter will be apparent from the following description and the appended claims.

DETAILED DESCRIPTION

Figure 1:
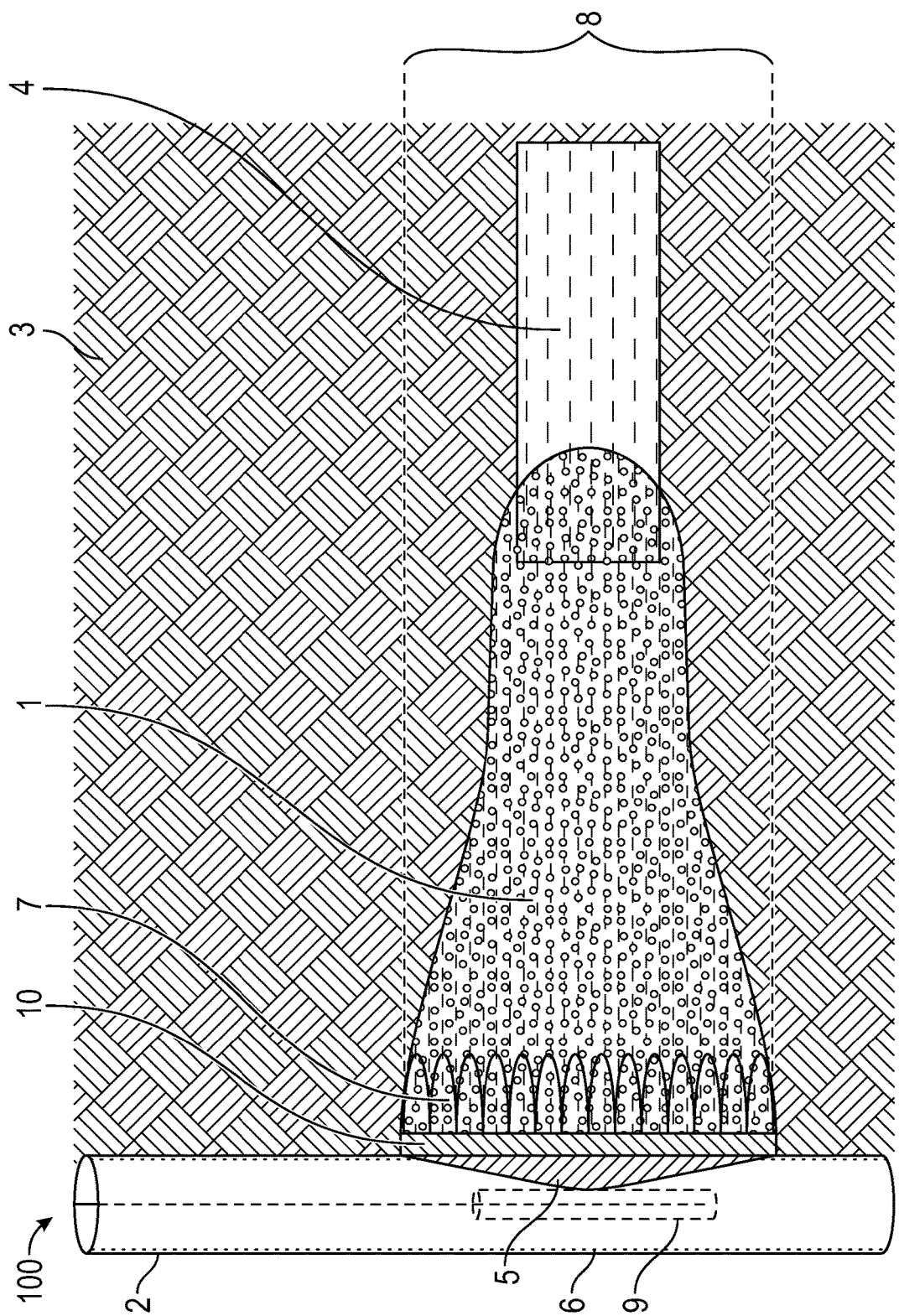
FIG. 1 is a schematic of a subterranean well system according to embodiments of the present disclosure.

Embodiments of the present disclosure are directed at preventing flowback of water shut-off materials into wellbores. In particular, water shut-off material may be enclosed with a silicate treated with a high powered energy source to create a solid barrier to contain the water shut-off material within the reservoir.

In particular, embodiments disclosed herein may shield the water shut-off material during the time the water shut-off material is injected into the target zone and the time it solidifies with enough mechanical strength to remain in the target zone. Embodiments may also shield the water shut-off material in the event the water shut-off material degrades (with time and/or temperature) thereby possessing insufficient mechanical strength to operate as a reliable permanent plug. Thus, embodiments may keep the water shut-off material in the target zone to prevent the water shut-off material from flowback, either during the solidification process or in the event of water shut-off degradation.

The problem of water presence in wells is traditionally solved using techniques adapted to cover, seal or otherwise plug openings, thereby shutting off or reducing the passage of water into the wellbore. Reducing excessive water production typically starts with locating the points of water entry, evaluating the water flow and heterogeneity of the reservoir rock, and the schematics of the wellbore. Advanced production tools such as production logging tools, fiber optic technology, may be used to accurate identify and access the subterranean water characteristics. Water production data and the identification of production zones informs where to target a water shut-off treatment.

Water shut-off treatments may be performed by chemical techniques. Chemical water shut-off treatments may lead to an improved conformance in the reservoir as well as a potentially permanent blocking of unwanted water production zones. Chemical treatments close the paths of least resistance (example, open features) that direct water to the wellbore by reducing the permeability of these paths. The area of unwanted water flow (or may flow) to a wellbore may be called a target zone. Chemical water shut-off treatments may also direct water to sweep oil from the matrix rock, thereby improving the oil production. Chemical treatments may also move between layers and features of the matrix, to reach and close distant target zones. Chemical treatment operations may be designed based on the characteristics of the reservoirs, the chemical properties of the reservoir and water shut-off material, and the placement accuracy of the injected chemicals. Chemical treatments for water shut-off operations include utilizing resins, solid particles, foams, polymer flooding, and gel injections.

In one or more embodiments, chemical gel injection may be used for water shut-off operations in wells. Chemical gel injection water shut-off techniques are understood to be effective in reducing the permeability of undesirable zones (target zones) and improving sweep efficiency. Gel polymer systems for water shut-off treatments include polymers such as polyacrylamide with different degrees of hydrolysis (partially hydrolyzed polyacrylamide) and polysaccharide such as xanthan biopolymer. The polymers may be cross-linked with metallic and organic cross-linkers to produce a three-dimensional polymer structure of the gel.

Gel polymer systems may be composed of a water-soluble polymer gel and a crosslinking agent dissolved in an aqueous solution. The polymer gel system may also include preformed gels and foamed gels. While gel polymer systems may be attractive and potentially permanent methods to reduce high water cut, gel polymer treatments may be difficult to control, particularly during the solidification/gelation time in the target zone.

Gel injection operations may include three stages: modeling, designing, and executing. In modeling, available information about the reservoir and the well may be gathered, such as the reservoir parameters, water entry points, drilling operation reports, and production history. However, the precision required to determine the physical and chemical characteristics of the water producing layers in the area of the wellbore may not be enough to reliably predict the gelling process of the water shut-off material.

In designing, the information about the reservoir and well is used to design the properties of the water shutoff material, such as a polymer gel fluid. The design of the polymer gel may include the gel's viscosity, the nature of the gel phase (e.g., aqueous phase), gel density, and injection time.

In executing gel injection, the polymer gel is injected into the target zone. Longer injection time leads to a greater likelihood of a successful water shut-off operation because it allows for the gelant to solidify and seal off large features and least resistant paths. After allowing sufficient time, the gel sets into a solid mass, and behaves as a flow diverting or blocking agent.

Gelation/solidification of the water shut-off material can vary from several hours to several days. Prior to gelation/solidification, the water shut-off material is difficult to enclose in the target zone and control due to the physics of gelling under shear stress, as well as the chemistry of the polymer gels in aqueous solutions. High temperature and pressure zones may increase the time it takes for the polymer gel systems to solidify, thereby increasing the potential for flowback into the well. Gel strength enhancers, such as cement and silica, may be used in the water shut-off material matrix to enhance the strength of the gelant, particularly in high temperature conditions. However, the strength enhancers do not prevent the gelant from flowback into the well after placement and prior to gelation/solidification.

These water shut-off materials may require time to solidify to stay in place. Without the implementation of the present embodiments, the viscous water shut-off material may seep into the well before it solidifies, potentially leading to a failure to block water from entering the production stream, the presence of the water shut-off material in the production stream, and a water shut-off material blockage in the wellbore. Thus, it is desirable to prevent flowback of the water shut-off material, such as a polymer gel, after placement in the target zone. Water shut-off material flowback may compromise the integrity and strength of the water shut-off material since it may change the overall volume and placement of the injected water shut-off material in the target zone. Design parameters of a water shut-off operation may require set amount of water shut-off material in the target zone to be effective in blocking the flow of water. Loss of water shut-off material due to flowback may result in an overall failure of the water shut-off operation. Flowback may also compromise well production. The water shut-off material may flow into the well, thereby impeding or blocking the flow of hydrocarbons through the well and causing costly repairs, or well closure.

Embodiments of the present disclosure may provide the desired support for the water shut-off material to stay in the target zone of the near wellbore formation. According to embodiments of the present disclosure, saturated near wellbore formations may be treated with a silicate solution to prevent chemical water shut-off material from flowback from the treated (target) zone. A silicate solution may be injected into the near wellbore region of the target zone to form a layer in the porous media between the water shut-off material and the wellbore. In embodiments of the present disclosure, the silicate may be sodium silicate.

In embodiments of the present disclosure, the silicate and water shut-off material may be disposed within the rock matrix of a near wellbore formation, and the water shut-off material may extend from the near wellbore formation into the far wellbore formation or adjacent a water zone. In some embodiments of the present disclosure, the silicate solution may extend from the wellbore formation to the near wellbore formation. For example, in one or more embodiments, the silicate solution may extend into the formation from 2.5 to 25 cm from the wellbore wall.

In some embodiments of the present disclosure, an energy source, such as a high power laser, may be used to treat the silicate in the wellbore. A layer of silicate may be injected into the porous rock matrix behind the water shut-off material in the target zone. Once the silicate forms a layer between the exposed portion of the water shut-off material and the wellbore, a high power laser may be lowered into the wellbore. The high powered laser may increase the temperature of the wellbore, or near wellbore formation, including the porous rock containing the silicate. The elevated temperature induced by the high powered laser may results in chemical and physical changes within the silicate solution, including the triggering of crystallization of the silicate into glassy sealant. The induced elevated temperature may depend on parameters of the high power laser, including the power and intensity of energy emitted from the laser. The treated glassy sealant may act as a spacer to shield the in-situ chemicals, such as the chemicals used in a water shut-off operation, from flowing back into the wellbore. The glassy sealant may also plug and enclose the in-situ water shut-off material. By shielding or enclosing the water shut-off material with the heat-treated silicate, the water shut-off material may be prevented from flowing from the target placement and provide the water shut-off material the time necessary to solidify and become immobile. The length of time required for the laser to heat the silicate may vary, depending on the design and conditions present in the wellbore, and may be as short as a couple minutes.

In one or more embodiments of the present disclosure, the concentration range of silicate in the silicate solution may be between 30 wt % to 40 wt %. In one or more embodiments of the present disclosure, the pH range of the silicate solution may be from 11 to 12.

As shown in FIG. 1, subterranean well system 100 may be a subterranean wellbore 2 used in hydrocarbon production operations. The subterranean wellbore 2 may be lined with a casing 6. The subterranean wellbore 2 is shown as a vertical cased well, however it will be understood by those skilled in the art that the subterranean wellbore 2 may be open hole, angled or slanted, horizontal, or a multilateral well. Perforations 7 may extend through the sidewall of the casing 6. The perforations 7 may vary in size and may be penetrated by aqueous fluids, including water, water shut-off material, and silicate solutions according to the present disclosure. The perforations 7 may be in fluid communication with fractures and/or a fracture network that extend into the reservoir formation 3.

As shown the subterranean well system 100 in FIG. 1, water shut-off material 1 may be placed via injection operations into the reservoir formation 3 to block the flow of water from the water zone 4 to the wellbore 2 and near wellbore 2. Injection operations may include pumping the water shut-off material down the wellbore 2 and into a target zone of the reservoir formation 3. The water shut-off material 1 may be pumped until the water shut-off material 1 permeates into the water zone 4. The water shut-off material 1 prevents the water zone from extending into the near wellbore 2 area by permeating and solidifying in the spaces in the reservation formation 3. An exposed portion 8 of the water shut-off material may be disposed along the length of a portion of the wellbore 2. As used herein "exposed" refers to the portion of the water shut-off material that is in the near-wellbore region of the formation or otherwise subject to potentially flowback into the wellbore during gelation or solidification of the water shut-off material.

After the water shut-off material 1 is injected into the reservoir formation 3 and before it solidifies, the water shut-off material 1 may conventionally seep back into the wellbore 2, particularly along the exposed area 8. To prevent flowback to the wellbore 2 along the exposed portion 8, a sodium silicate solution 10 is injected along exposed portion 8 after the placement of the water shut-off material 1 is complete. The sodium silicate solution 10 may be injected via a pumping operation. The sodium silicate solution 10 may be disposed in a way that completely shields or encloses the water shut-off material 1 from the wellbore 2, thereby creating a barrier between the water shut-off material 1 and the wellbore 2.

According to embodiments of the present disclosure, a laser downhole tool 9 may be used to direct energy 5 to increase the temperature of the sodium silicate solution 10. As the temperature of the sodium silicate solution 10 increases, the sodium silicate molecules form a solid, glassy seal. The time required for the laser to create the sodium silicate seal may be negligible to several minutes, depending on wellbore conditions. The temperature may need to reach between 150° C. to 400° C. depending on the composition of the sodium silicate pours media and wellbore conditions. The temperature of the sodium silicate solution 10 may depend on the parameters of the laser downhole tool 9, including the power and intensity of the direct energy 5.

Figure 2:
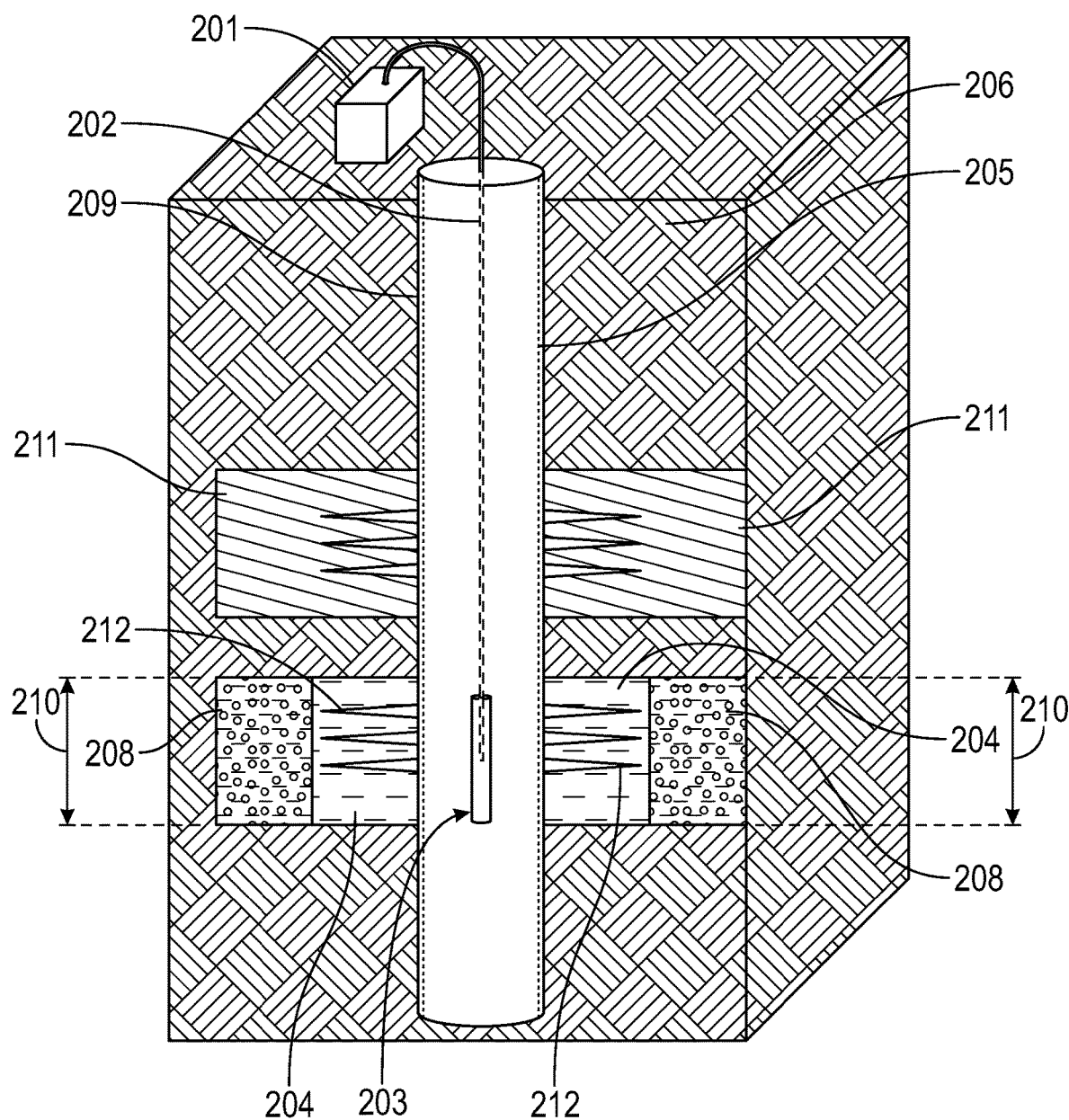
FIG. 2 is a schematic of a subterranean well system according to embodiments of the present disclosure.

FIG. 2 shows a schematic representation of water shut-off operation 200 with a sodium silicate sealant of the present disclosure. As shown in FIG. 2, water shut-off material 208 is pumped into a target zone 210. The target zone 210 may be the area wherein water may enter the production operation through fractures (not shown) in the reservoir 206 and perforations 212 in the wellbore casing 205. The perforations 212 may extend into the reservoir 206. As shown in FIG. 2, water shut-off material 208 may be pumped below an oil producing zone 211. This may be the case in water coning where water builds up below an oil producing zone. In some embodiments, sodium silicate solution 204 is pumped immediately after the water shut-off material 208 is in place in the target zone 210. The sodium silicate solution 204 may permeate the matrix of the reservoir 206 between the water shut-off material 208 and the wellbore 209. In some embodiments of the present disclosure, the sodium silicate solution 204 may overlap with the water shut-off material 208.

As shown in FIG. 2, some embodiments of the present disclosure may include lowering a laser downhole tool 203 from a laser generation unit 201 via a fiber optic wire 202. The laser generation unit 201 may control the generation of the laser, including the strength and location of the laser. The laser downhole tool 203 directs energy to the sodium silicate solution 204. The sodium silicate solution 204 may permeate into a portion of the wellbore casing 205 and into the reservoir 206 to create a barrier between the water shutoff material 208 and the wellbore 209. The laser downhole tool 203 may direct energy via a laser to the sodium silicate solution 204 along the target zone 210 of the wellbore 209. The target zone 210 may be defined as the area wherein high water cut occurs in the production operation. The laser downhole tool 203 may be configured to treat the sodium silicate solution 204 in the target zone 210 by directing a beam of energy to a portion of the target zone 210 and rotating the laser downhole tool 203 to increase the temperature of the sodium silicate solution 204 in a radial progression. The laser downhole tool 203 may also direct energy radially, increasing the temperature of the sodium silicate solution around the target zone 210.

Figure 3:
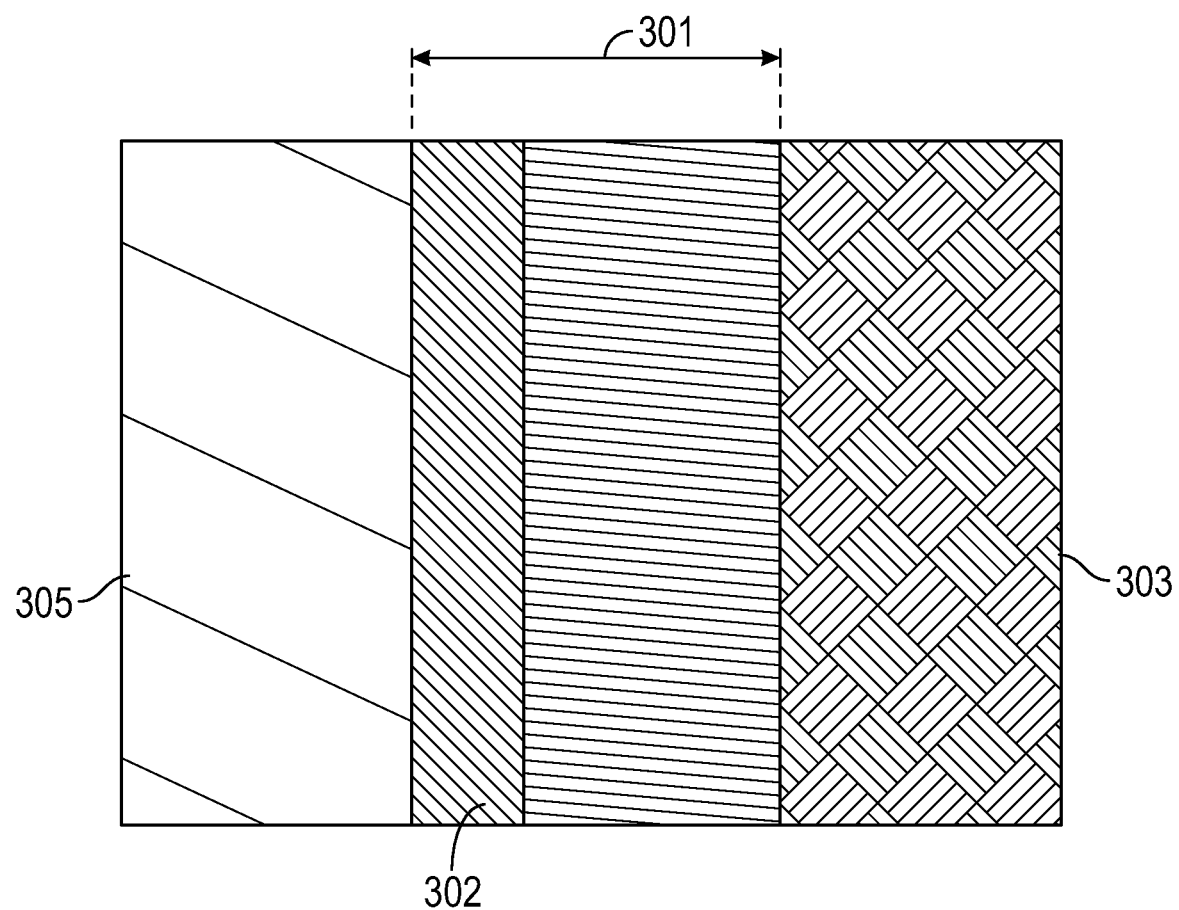
FIG. 3 is a cross section of a wellbore and reservoir formation according to embodiments of the present disclosure.

As shown in FIG. 3, the heat produced by the laser downhole tool (203 in FIG. 2) causes the sodium silicate in the sodium silicate solution (204 in FIG. 2) to bond and form a solid glassy sodium silicate layer 301 between the opening of the wellbore 305 and the water shut-off material 303 in a high watercut zone. The solid glassy sodium silicate layer 301 may be present in the wellbore casing 302 and may reach the water shut-off material 303. Once the solid glassy sodium silicate layer 301 forms, the laser downhole tool (203 in FIG. 2) may be removed from the wellbore 305. In some embodiments of the present disclosure, the solid glassy sodium silicate layer 301 may extend from the wellbore to the near wellbore and may be up to 25 cm thick.

Although FIG. 3 shows a single solid glassy sodium silicate layer 301 disposed next to the water shut-off material 303, some embodiments of the present disclosure may include unreacted sodium silicate solution between the solid glassy sodium silicate layer 301 and the water shut-off material 303.

Although embodiments of the present disclosure include the use of laser energy via a laser downhole tool, it will be understood by those skilled in the art that the energy source may include a variety of techniques configured to direct energy to a sodium silicate solution, increase the temperature of the sodium silicate solution to form a solid sodium silicate layer.

According to embodiments of the present disclosure, the solid glassy sodium silicate layer as shown in FIG. 3 may remain in place in the wellbore until the water shut-off material completes the solidification process. Once the water shut-off material is completely solid/gelled, the water shut-off mater may semi-permanently to permanently block water flow into the wellbore through fractures and perforations. At that point, the solid glassy sodium silicate layer may be allowed to decompose or it may be kept in place depending on the needs of the production operation. Thus, it is envisioned that there is no need to remove or decompose the solid glassy sodium silicate layer.

EXAMPLE

Laboratory tests were conducted to measure the permeability of material treated with heated sodium silicate. In the tests, the permeability of an untreated rock sample was measured at 90 mD. The rock was representative of a type of rock matrix present embodiments of the present disclosure. The sample was then saturated with a sodium silicate solution and then exposed to a high powered laser for one (1) minute.

The high powered laser increased the temperature of the sodium silicate, thereby bonding the sodium silicate molecules in a solid, glassy structure within the rock matrix. The permeability test was performed again on the treated rock sample. The treated rock sample permeability was 1.8 mD. The treated rock sample had 98% blockage of the porous media. The result of the test showed the efficiency of sodium silicate treated with a high power laser in plugging a flow of pours media through a rock matrix in a short amount of time.

In some embodiments of the present disclosure, the silicate solution and then solid glassy sodium silicate may be used as a spacer to hold in-situ water shut-off chemical from encroaching into the wellbore prior to solidification.

Embodiments of the present disclosure may provide at least one of the following advantages. Embodiments of the present disclosure prevent water shut-off material from seeping (flowback) out of the target zone and into the wellbore. The water shut-off material blocks water from entering the wellbore and creating a high water cut product. Embodiments of the present disclosure may stabilize the water shut-off material after placement in the target zone and during gelation time. The water shut-off material requires time for solidification/gelation once in the target zone. The solid glassy silicate in embodiments of the present disclosure holds the water shut-off material in place, providing the time necessary for the water shut-off material to immobilize in the target zone. Also, embodiments of the present disclosure may create a stable static barrier between the water shut-off material and the well, particularly during gelation time of the water shut-off material.

Although embodiments of the disclosure described above describe enclosing water shut-off material, those skilled in the art will readily appreciate that embodiments of the present disclosure may be used to permanently reduce or completely plug the flow of other fluids in subterranean formations into subterranean wells using the methods as described in the disclosure. Examples of other plug operations include sweep treatments, gas production, abandoned subterranean formations, shut-off fractures and operations that otherwise alter the permeability of subterranean formation.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A process for a treatment of a subterranean formation, comprising:
    pumping a water shut-off material into a wellbore and to a target zone in the subterranean formation;
    pumping a silicate to the target zone behind the water shut-off material, thereby forming a layer of silicate between the water shut-off material and the wellbore; and,
    directing an energy source to the layer of silicate until the layer of silicate solidifies to yield a solid barrier between the water shut-off material and the wellbore, thereby preventing flowback of the water shut-off material from the target zone.

2. The process of claim 1, wherein the water shut-off material is a polymer gel.

3. The process of claim 1, wherein the silicate is present in an aqueous solution.

4. The process of claim 1, wherein the silicate is sodium silicate.

5. The process of claim 1, wherein the energy source is a laser.

6. The process of claim 5, further comprising lowering the laser into the wellbore to the target zone.

7. The process of claim 1, wherein the silicate is present at a concentration of up to 40%.

8. The process of claim 7, wherein the silicate concentration is between 30 wt % and 40 wt %.

9. The process of claim 1, wherein the silicate pH is between 11 and 12.

10. The process of claim 1, wherein the energy source increases the heat of the silicate to a temperature between 150° C. to 400° C.

11. A system for a treatment of a subterranean formation, comprising:
    a wellbore extending through the subterranean formation;
    a water shut-off material, configured to block a fluid from entering a wellbore;
    a sealant material between the water shut-off material and the wellbore, wherein the sealant material is a silicate; and
    an energy source configured to direct energy to the sealant material and increase the temperature of the sealant to form a solid barrier between the water shut-off material and the wellbore.

12. The system of claim 11, further comprising a water shut-off material pump configured to pump the water shut-off material into the wellbore to a target zone.

13. The system of claim 11, further comprising a sealant pump configured to pump the silicate into the wellbore to a target zone.

14. The system of claim 11, wherein the energy source is a laser.

15. The system of claim 14, further comprising a laser generation unit configured to control the generation of the laser in the wellbore.

16. The system of claim 11, wherein the silicate is sodium silicate.

17. The system of claim 11, wherein the energy source is configured to increase the temperature of the sealant to 150° C. to 400° C.

* * * * *